(12) United States Patent
Battles et al.

(10) Patent No.: US 9,710,824 B1
(45) Date of Patent: Jul. 18, 2017

(54) METHOD TO INTRODUCE PURCHASE OPPORTUNITIES INTO DIGITAL MEDIA AND/OR STREAMS

(75) Inventors: Matthew H. Battles, San Francisco, CA (US); Jonathan A. Gold, Palo Alto, CA (US)

(73) Assignee: A9.Com, Inc., Seattle, WA (US)

( * ) Notice: Subject to any disclaimer, the term of this patent is extended or adjusted under 35 U.S.C. 154(b) by 1755 days.

(21) Appl. No.: 11/539,950

(22) Filed: Oct. 10, 2006

(51) Int. Cl.
*G06Q 30/00* (2012.01)
*G06Q 30/02* (2012.01)
*G06Q 30/06* (2012.01)

(52) U.S. Cl.
CPC ......... *G06Q 30/0255* (2013.01); *G06Q 30/02* (2013.01); *G06Q 30/0203* (2013.01); *G06Q 30/0224* (2013.01); *G06Q 30/06* (2013.01); *G06Q 30/0641* (2013.01)

(58) Field of Classification Search
CPC ............... G06Q 30/02; G06Q 30/0203; G06Q 30/0224; G06Q 30/0255; G06Q 30/06; G06Q 30/0641
USPC ................... 705/26, 27, 26.1, 27.1
See application file for complete search history.

(56) References Cited

U.S. PATENT DOCUMENTS

| | | | |
|---|---|---|---|
| 4,941,172 A | 7/1990 | Winebaum et al. | |
| 5,584,025 A | 12/1996 | Keithley et al. | |
| 5,909,023 A | 6/1999 | Ono et al. | |
| 6,006,988 A | 12/1999 | Behrmann et al. | |
| 6,574,793 B1 * | 6/2003 | Ngo | H04N 7/16 348/E7.054 |
| 6,616,533 B1 * | 9/2003 | Rashkovskiy | 463/31 |
| 6,698,020 B1 * | 2/2004 | Zigmond | H04N 5/44513 348/E5.102 |
| 6,954,735 B1 | 10/2005 | Djupsjobacka et al. | |
| 7,050,994 B1 | 5/2006 | McIntyre et al. | |
| 7,100,183 B2 * | 8/2006 | Kunkel | H04N 7/16 348/E7.06 |
| 7,110,714 B1 * | 9/2006 | Kay et al. | 455/3.02 |
| 7,120,592 B1 | 10/2006 | Lewis | |
| 7,313,802 B1 * | 12/2007 | Tomsen | G06Q 30/02 348/E7.071 |
| 7,343,617 B1 * | 3/2008 | Katcher | G06F 17/30855 375/E7.008 |
| 7,448,063 B2 * | 11/2008 | Freeman | G03C 1/26 348/157 |
| 7,711,609 B1 * | 5/2010 | Rolf | G06Q 30/02 705/26.5 |

(Continued)

OTHER PUBLICATIONS

"VOD's quest for the revenue grail: server makers edge closer to goal of dynamic ad insertion," by Matt Stump, Multichannel News, 26.41: 32(), New Bay Media (Oct. 3, 2005).*

*Primary Examiner* — Anne Georgalas
(74) *Attorney, Agent, or Firm* — Lee & Hayes, PLLC (57) ABSTRACT

A method for using metadata in digital media or streams to offer goods and/or services for sale including defining and promoting a specification for embedding goods and/or services offerings in programming digital media or digital streams and providing an application programming interface (API) to facilitate building a custom checkout user interface on a digital media playing device. The method also includes receiving, at a server or service via the custom checkout user interface, at least one of consumer orders for offered goods and/or services and requests to place offered goods and/or services on a consumers' list.

21 Claims, 5 Drawing Sheets

(56) References Cited

U.S. PATENT DOCUMENTS

| | | | | |
|---|---|---|---|---|
| 8,132,202 | B2* | 3/2012 | Swix | G06Q 30/02 |
| | | | | 725/14 |
| 8,261,306 | B2* | 9/2012 | Dimitrova | G06Q 30/02 |
| | | | | 725/32 |
| 8,589,984 | B1* | 11/2013 | Acharya | H04N 21/2542 |
| | | | | 725/36 |
| 2003/0028432 | A1* | 2/2003 | Troyansky et al. | 705/14 |
| 2003/0167465 | A1* | 9/2003 | Davis et al. | 725/32 |
| 2004/0254887 | A1* | 12/2004 | Jacoby | 705/52 |
| 2005/0022226 | A1* | 1/2005 | Ackley et al. | 725/23 |
| 2005/0132420 | A1* | 6/2005 | Howard et al. | 725/135 |
| 2006/0150218 | A1* | 7/2006 | Lazar et al. | 725/60 |
| 2006/0230123 | A1* | 10/2006 | Simmons et al. | 709/219 |
| 2006/0271953 | A1* | 11/2006 | Jacoby | H04N 7/173 |
| | | | | 725/34 |
| 2007/0091093 | A1* | 4/2007 | Li et al. | 345/473 |
| 2007/0300261 | A1* | 12/2007 | Barton et al. | 725/58 |
| 2008/0004957 | A1* | 1/2008 | Hildreth et al. | 705/14 |
| 2008/0092181 | A1* | 4/2008 | Britt | H04N 7/1675 |
| | | | | 725/87 |

\* cited by examiner

METHOD TO INTRODUCE PURCHASE OPPORTUNITIES INTO DIGITAL MEDIA AND/OR STREAMS

BACKGROUND OF THE INVENTION

This invention relates generally to the opening of new marketing opportunities, and more particularly, to the opening of new marketing opportunities by introducing purchase opportunities into digital media and/or streams.

Oftentimes, people watching or listening to a program such as a TV show, movie, video, or audio presentation find something on the program that they like and would consider purchasing if they had easy access to such a purchase opportunity. For example, someone watching a show may see a particular article of clothing they like, such as a jacket. However, typically in order to purchase such an article, one has to research the article to determine who makes it, where it can be purchased and then either go to the store, go online and find the appropriate site(s), or find a catalog and purchase it. All of these approaches require the consumer to actively find the product they saw and then take the appropriate steps to purchase the article.

BRIEF DESCRIPTION OF THE INVENTION

In one embodiment, a method is provided for using metadata in digital media or streams to offer goods and/or services for sale. The method includes defining and promoting a specification for embedding goods and/or services offerings in programming digital media or digital streams and providing an application programming interface (API) to facilitate building a custom checkout user interface on a digital media playing device. The method also includes receiving, at a server or service via the custom checkout user interface, at least one of consumer orders for offered goods and/or services and requests to place offered goods and/or services on a consumers' list.

In another embodiment, a method is provided for introducing purchase opportunities into digital media or streams. The method includes defining a specification for embedding goods and/or services offerings in digital media or digital streams. The offerings includes product information that can be used to purchase the product and a price for the product. The method also includes embedding the product offerings in the digital media or streams so that it is accessible to a consumer of the media upon action by the consumer.

In another embodiment, a method is provided for using metadata in digital media or streams to offer goods and/or services for sale. The method includes embedding goods and/or services offerings in programming digital media or digital streams, providing an application programming interface (API) to facilitate building a custom checkout user interface on a digital media playing device, and receiving, at a server or service via the custom checkout user interface, at least one of consumer orders for offered goods and/or services and requests to place offered goods and/or services on a consumers' list.

In another embodiment, a method is provided for using metadata in digital media or streams to offer goods and/or services for sale. The method includes embedding goods and/or services offerings in programming digital media or digital streams and facilitating the purchase of at least one of the offerings by transmitting to a server or service, at least one of consumer orders for offered goods and/or services and requests to place offered goods and/or services on a consumers' list.

In another embodiment, a method is provided for introducing purchase opportunities into digital media or streams. The method includes embedding at least one product offering in the digital media or digital streams to create a product oriented digital media or stream such that a consumer can view information pertaining to the at least one offered product and can purchase at least one of the offered products by highlighting an offered product while viewing a program in which the offered product is displayed.

DETAILED DESCRIPTION OF THE INVENTION

The foregoing summary, as well as the following detailed description of certain embodiments of the present invention, will be better understood when read in conjunction with the appended drawings. It should be understood that flow charts presented herein represent only examples of configurations of the present invention, and that not all steps need be present in all configurations of the present invention. Furthermore, the ordering of some of the steps within the flow charts can be rearranged in some configurations of the present invention, and/or some of the steps may be performed simultaneously with other steps and/or may be performed continuously. Also, in each step requiring the participation of a party, that party or his or her agent may participate in performing that step. Thus, when a party is recited in a step of a method, the recitation is considered as including within its scope any agent acting on behalf of that party. Also, unless otherwise explicitly stated, the terms "or" and "and/or" do not necessarily imply that a particular configuration must include an explicit choice within a step. For example, if a step recites "A and/or B," where A and B are possible actions, devices, signals, etc., it is sufficient for an embodiment incorporating this step to handle only either A or B without any steps or elements to handle the other or to make a choice between them. However, an embodiment that does happen to handle both A and B or that does have steps or elements to handle the other or make a choice between them also falls within the scope of the recitation.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising", "including" or "having" an element or a plurality of elements having a particular property may include additional such elements not having that property. In addition, as used herein, the term "server or service" acknowledges the fact that any of the various known Internet protocols may be used, and/or new, proprietary protocols. Thus, a server or service may comprise, for example, a webserver or other device that operates using some other network transport, which could be a presently known transport or a proprietary transport built on raw TCP/UDP. The transport(s) actually used can be selected by one of ordinary skill in the art of Internet communication and/or programming, and are not considered part of the present invention.

The term "product offering", as used herein, refers to an offer to sell a product or to place the product on a consumer's "wish list." The product offering embedded in the digital media and/or digital stream includes product identification information (for example, a vendor product number, such as an AMAZON® standard item number or ASIN) and other information that could be utilized for identification purposes as well as the price for which the product is being offered. The product placement advertising channel is defined in such a manner as to allow the placing of product offerings within the digital media or streams.

Figure 3:
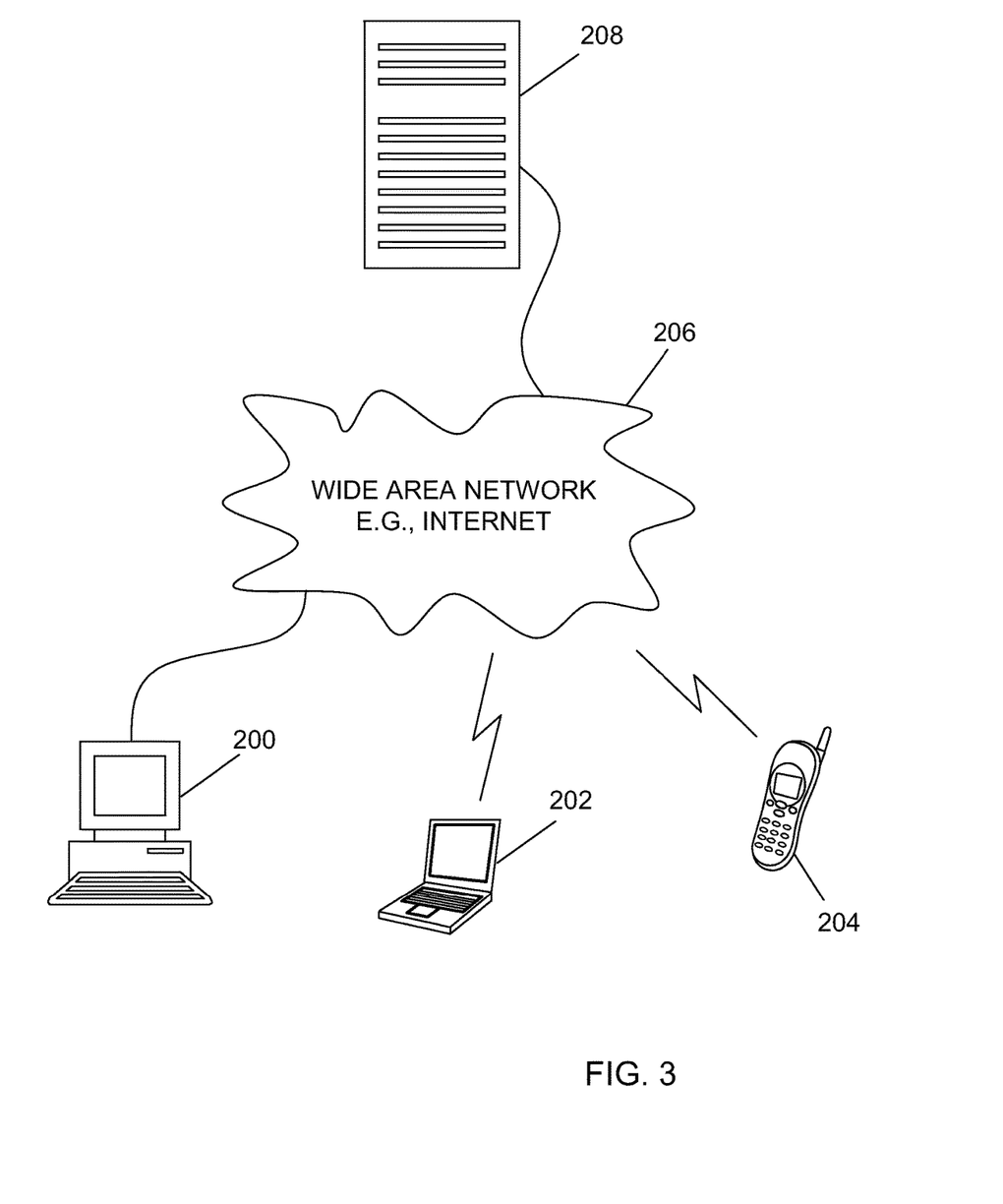
FIG. 3 is an example network usable with the embodiments described herein.
Figure 4:
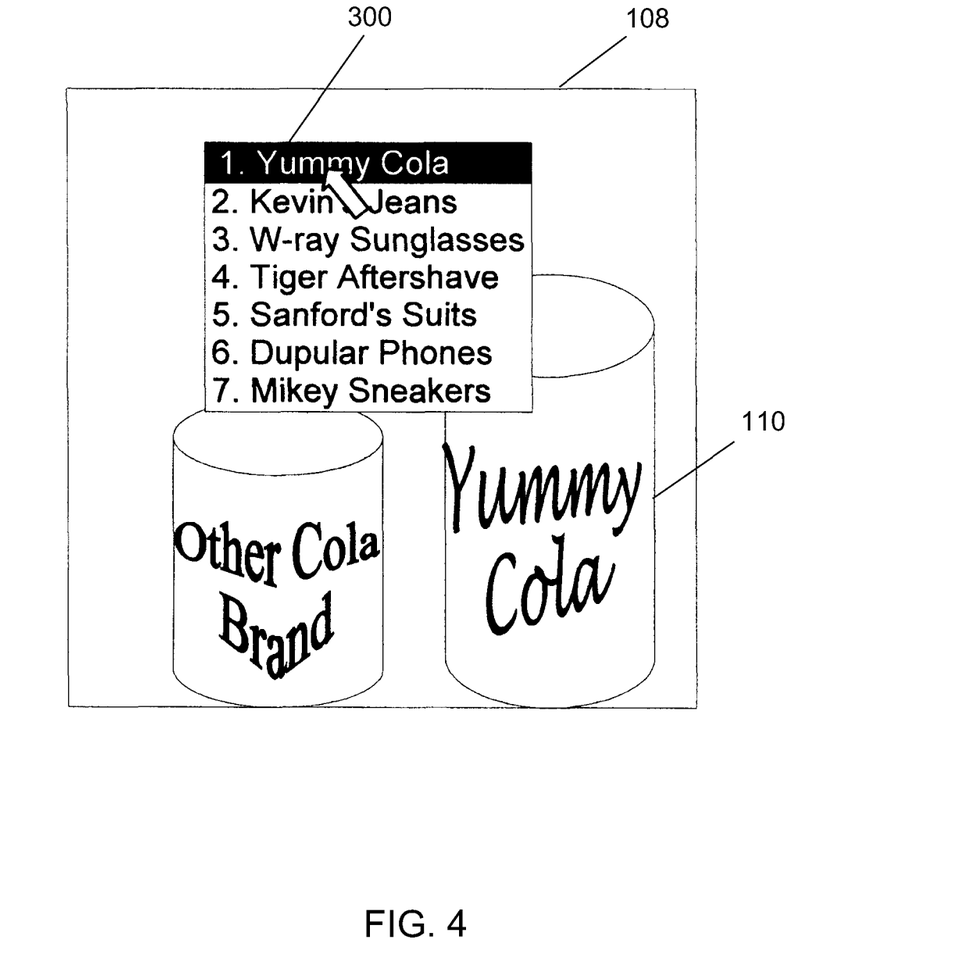
FIG. 4 is an example user interface window for selecting products in a display of video data.

In some configurations of the present invention, a method is provided that includes the user of metadata in digital media or streams (a digital medium) to sell products (such as goods and/or services). Exemplary digital medium include video and/or audio. More particularly, in some configurations, a programmer, such as an original content producer, an advertiser agency or producer, or a media channel or network, embeds metadata in a video stream of a digitally streamed or recorded program specifying which goods and/or services are referenced in each scene of a show. For example, as depicted in FIG. 4, a consumer can then view a pop-up list 300 of available items 110 in a frame 108 of a digital medium and/or mouse over or tab through on-screen hotspots. The consumer can click (e.g. one-click) to purchase or add to a shopping cart or a wish list, as specified by a user's preferences. For example, the consumer can see an item of interest, such as a hat, highlight the hat, such as by tabbing over it, and click on the hat to purchase it. The consumer can also view additional product information provided, for example, by a seller. Thus, a consumer could, as depicted in FIG. 3, using an electronic device such as a computer 200, laptop 202, or mobile device 204, immediately buy a product shown in an advertisement, a product placed in an episode of a show, a book plugged by a talk-show guest, or a CD or other type of recording of a band playing on a variety or late-night show. Further, FIG. 3 depicts a webpage stored on a server that may transmit over a network 206 the herein-discussed digital media or streams to a user device, such as the computer 200, laptop 202, or mobile device 204.

Figure 1:
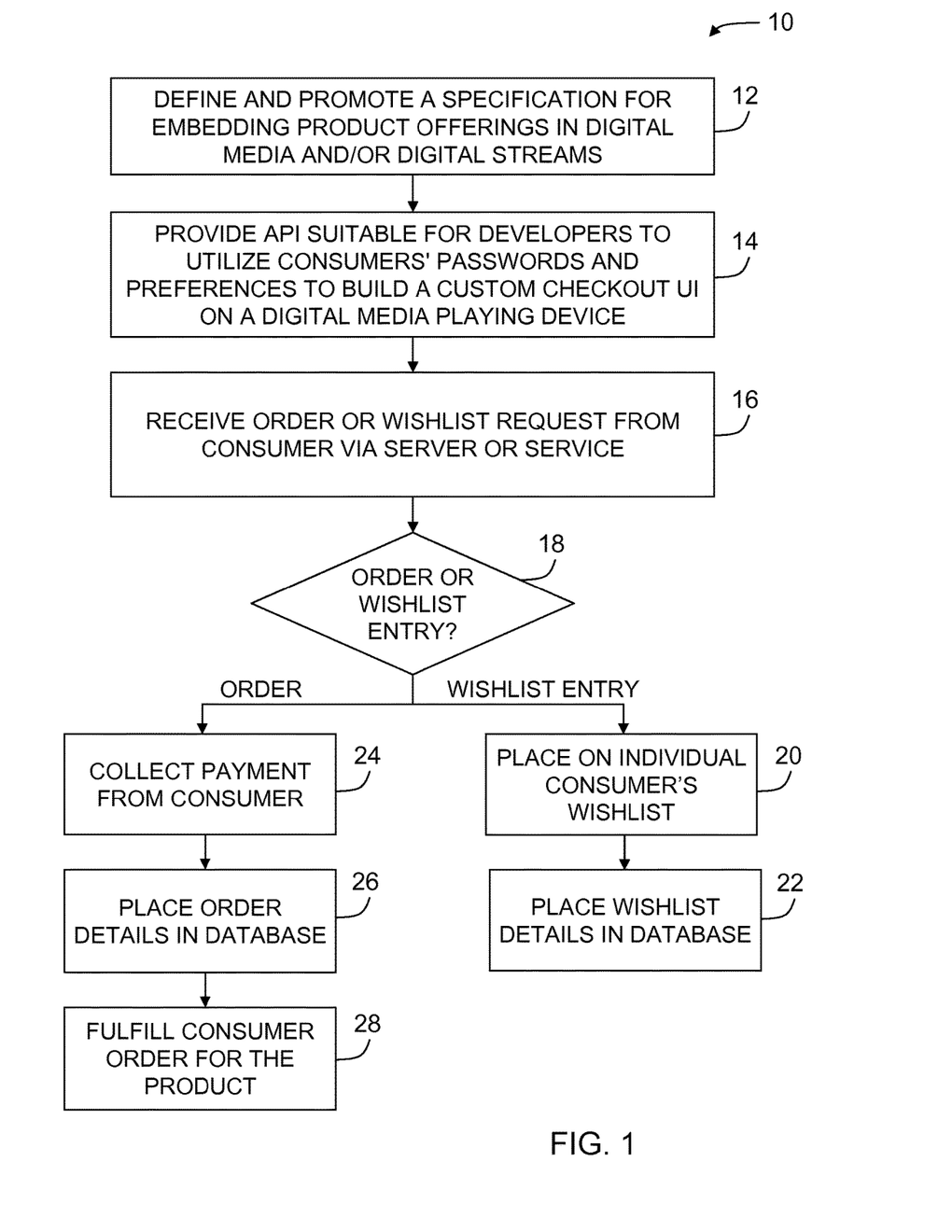
FIG. 1 is a flow chat representing a method configuration of the present invention.

FIG. 1 illustrates a flow chart 10 in which a first entity (e.g., a person, corporation, or partnership) defines and promotes 12 (either by itself or by agents on behalf of itself) a specification for embedding a product placement advertising channel in digital media or digital streams (hereinafter referred to as a digital medium). Any specification that works to perform the embedding of product offerings can be used, and such specifications can be designed by those of ordinary skill in the art. The type of digital medium to which the specification applies can include any or all of digital radio, digital video, or a raw feed of product offering "pulses," delivered over some wire (Bluetooth, TCP, or others). The digital medium may be, for example, playable on digital video recorders (DVRs) such as from TIVO brand entertainment services, REPLAYTV brand recording software, and/or COMCAST brand programming distribution, and/or downloadable Internet video such as from AMAZON.COM brand computerized trading of goods and services, APPLE COMPUTER brand services, ITUNES brand retail store services, GOOGLE brand computer services, etc., and/or in-theater movie delivery, digital FM, satellite radio, and/or public appearances with a wireless local broadcasting supplement. In this embodiment, the digital medium includes video or both video and audio. In addition, digital audio media and streams are suitable for such specifications, particularly if the playback device has a video display (such as a mobile phone or an MP3 player).

Figure 2:
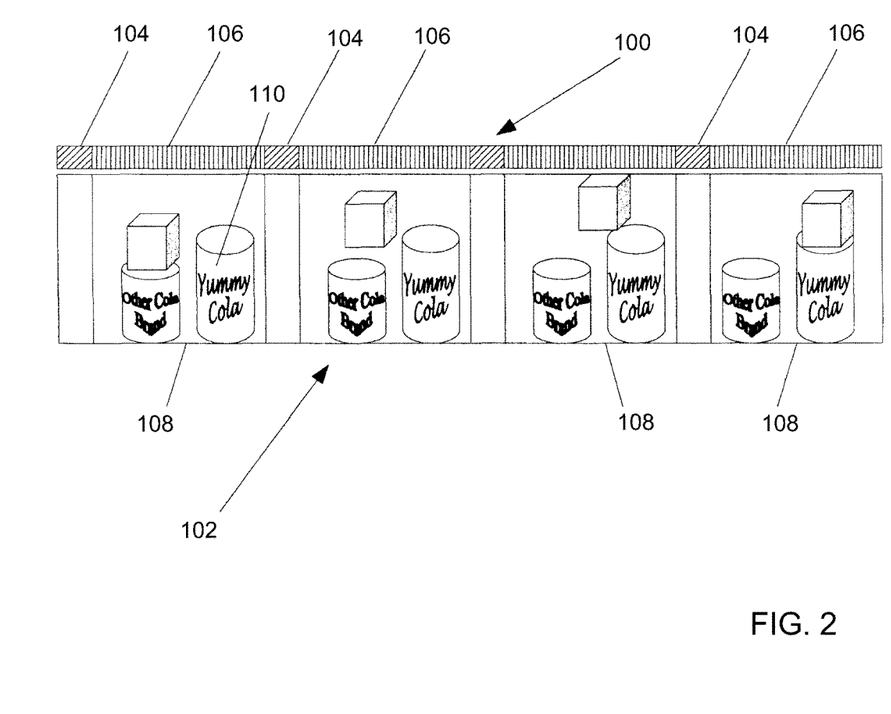
FIG. 2 is an example depiction of frames of video data with embedded metadata.

In accordance with one embodiment of the present invention, the product offerings are embedded in an existing digital medium for a program. In an alternative embodiment, the digital medium is stopped, the product information is inserted into the digital medium, and the existing digital medium then resumes. In another alternative embodiment, as depicted in FIG. 2, the product offerings may be associated with a product 110 reference in the existing digital medium of the program. Further, the product offerings can be embedded in a separate digital medium 100 and this separate digital medium 100 can be synchronized with the original digital medium 102 such that upon playing the program, both the original digital medium 102 and the product offering digital medium 100 are played synchronously. In all three of these embodiments, a product oriented digital medium is created such that a consumer can view information pertaining to products as well as purchase products by highlighting the product while viewing the program.

As one example, a digital stream specification indicates that product offerings be embedded between digital audio and video frames at a rate that is rapid enough not to be noticed by a viewer (analogous to the vertical blanking interval of a video stream). The video frames are displayed as a sequence of images on a display, and a product offering relating to a product being shown in the images is encoded in the stream. The product offerings are then synchronized with product references in the show.

In one embodiment, the product information is stored on a web page instead of in the product oriented digital medium. The web page contains a break down by segment of particular products in the program. The particular products are chosen as being those that should be advertised in the program. The product oriented digital medium then accesses this web page when an item is highlighted by the consumer, obtains the appropriate information from this web page, and displays it to the consumer. In a further embodiment, all of the detailed product information is stored at a selected location of the product oriented digital medium, such as the end, and is accessed when an item is highlighted by the consumer.

In another embodiment, the product oriented digital medium is created such that the consumer is polled while viewing the program. The polling facilitates determining whether the consumer would like to see purchase opportunities and/or product information regarding particular goods and services displayed in the program. The consumer can then choose whether to access the information. If the consumer indicates to the system that he/she would like to see such purchase opportunities and/or product information, these opportunities and/or information are displayed to the consumer.

In a further embodiment, multiple product oriented digital mediums are created such that each one is directed to appeal to a different demographic group. Specific purchase opportunities and/or product information are then included with the original digital medium for viewing by a particular demographic group. The program could then be shown in different regions with each region having different purchase opportunities and/or product information accessible during the program.

In one embodiment, the device utilized to display the program is an intelligent device such that it knows or learns the preferences of the consumer and/or consumers that utilize it. In this embodiment, the device provides purchase opportunities and/or product information for those items that the consumer has been interested in before, (e.g., previously purchased or previously inquired about) or those items that the consumer has indicated he/she prefers. In one aspect, the user logs onto a web page and fills out a questionnaire regarding preferences. This information is stored by a server and accessed when the consumer indicates on the web page that he/she will be viewing a program. Then when the consumer views the program, the server utilizes the indicated preferences to display purchase opportunities and/or product information about those types of items the consumer prefers. In one embodiment, the consumer views the program through the web page. Alternatively, the consumer accesses the web page before viewing the program through another device or portal.

In an alternative embodiment, pop-up lists are generated that are displayed by highlighting, such as mousing over or clicking on, a portion of a screen or on top of a product appearing in a scene, according to a protocol specified by the developer.

In one embodiment, the specification allows the content producer to specify that a media viewer (e.g., a video player or other device interacting with a consumer) show the offer only during a predetermined time range during the video being played or during a broadcast. In one aspect, the specification indicates that a product offering be attached for only a range or a substream in the digital media or digital media stream. Such a limited attachment could result, for example, in the product being offered only for a specific number of seconds or a specified number of frames. In another aspect the specification includes a facility for embedding additional product information that is viewable by the consumer. For example, a selection of available options and/or colors is provided, or current availability of the product is provided.

As shown in FIG. 1 at block 14, and in association with the specification defined and promoted at block 12, the first entity provides a secure application programming interface (API) that is suitable for use by developers. The API allows developers to utilize consumers' preferences to build a custom checkout user interface (UI) on a digital media playing device, such as the examples recited above. The consumer's password may be required for logging in to buy a product, for requesting more information about a product, or for adding the product to the consumer's wishlist. Alternatively, the user may be logged on to a site or may be viewing the program through a secure connection and therefore a password is not needed to buy the product, access the information, or add the item to a wishlist. The consumer's preferences may include a selection of electronic device to be used, so that the developer can provide a custom user interface that can be downloaded in accordance with the consumer's preferences. A consumer may use any one of a number of different devices to place an order (for example, mobile phones, DVRs, and portable music players). Thus, in some configurations of the present invention, developers of such devices and of applications that provide their user interface are provided an API to enable the developers to build a checkout user interface for their systems.

The desirability of such an interface is evident upon considering constraints imposed by such various devices as iPods® and standard TV remote controls. For example, various types of devices such as mobile phones, PDAs, MP3 players, etc., may connect via a wide area network such as the Internet to a central server or service. These devices can be equipped by their manufacturers to scan the content being played on the device for offerings and to prompt the consumer to purchase the offerings. As an example, during a song played over a digital radio or as a result of a digital recording of the song, the device can provide the consumer with specific product offerings made in conjunction with the song. As another example, during a live appearance by a speaker or an artist, or a screening of a movie in a movie theater, a product offering digital medium is transmitted synchronously with the performance and the device provides the consumer with specific product offerings made in conjunction with the performance. Interested consumers then complete the product purchase transaction from their device.

In another example, manufacturers of video players used to view TV shows (e.g., DVR manufacturers, digital cable and/or satellite companies, TV manufacturers, online viewers and software vendors, etc.) use the specification and APIs to build functionality into their devices to allow consumers to quickly and easily respond to a prompt about an embedded product offer so that a transaction may be completed. To initiate such a scenario, a product manufacturer (e.g., a clothing manufacturer) contacts an ad salesperson at a television network and requests a certain amount of air time to run an advertisement for a new product on the network. The ad salesperson is able to sell the time on the network and also offer the consumer product manufacturer an opportunity to embed an actual offer for the product into the TV advertisement itself, giving viewers a chance to click a button and purchase the product immediately. All that is needed by the network is information about the product as stored in the first entity's catalog and some pricing information. If the product manufacturer is interested, the deal can be completed.

In an alternative embodiment, the first entity contracts payment terms with at least one of the digital rights owner, the product manufacturer, the product distributor, or a combination thereof to share revenue from sales of the product. In this embodiment, the revenue sharing can be a flat rate, a percentage of the sales resulting from consumers placing orders at the first entity's secure server or service, or another arrangement.

Once the custom checkout user interfaces are available to consumers, they may include programs or computer code that is downloaded, supplied on a digital medium, or loaded in conjunction with content-carrying digital media or digital stream. In some embodiments, the custom checkout user interfaces are built into a device, e.g., instructions programmed in ROM or flash ROM that instruct a processor in the device to provide the custom checkout user interface.

Figure 1B:
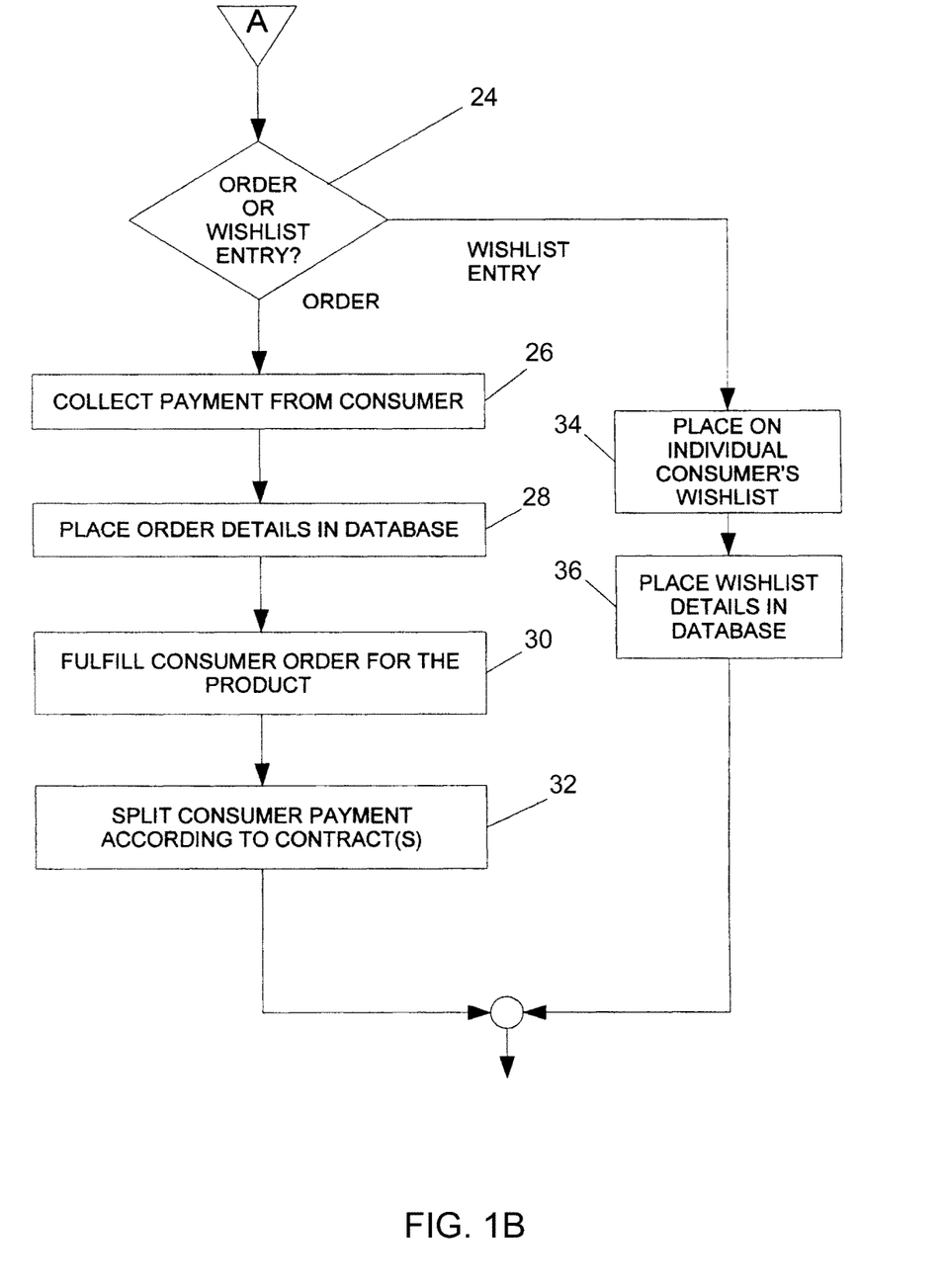
FIG. 1B is a continuation of the flow chart of FIG. 1.

Eventually, the first entity will start to receive 16 orders and/or wishlist requests from consumers via the first entity's secure server or service. A decision is made 18 by the server or service as to whether an order or a wishlist entry has been made by the consumer. If a wishlist entry was made, the item is placed 34 on the consumer's wishlist. In some configurations, wishlist details are placed 36 in a consumer database. If an order was placed, payment is collected 26 from the consumer e.g., by credit card, debit card, or other payment system, order details are placed 28 in the database, and the consumer order is fulfilled 30. As depicted in FIG. 1B, the consumer payment may be split according to the contract(s) 32.

The database used is steps 22 and 26 can be used by the programming entity and/or those associated with the manufacturing, advertising, and/or marketing of the product to learn the demographics to which the product or advertisement appeals and to determine the effectiveness of the campaign to market the product. It can also be used by the first entity to determine other products in which a particular consumer may also have an interest in purchasing. In some configurations, displayed product offerings, accepted product offerings, or both are tracked in the database and provided to other parties to permit custom tailoring of measurable deals. In addition, the information can be used to determine, based on the demographics, which products to advertise and in which parts of the country the ads should run. Links can also be added in the advertising to related products or products known to be sought after by similar demographics.

It will be appreciated that some configurations of the present invention provide an instant-on product placement channel for content producers in media channels that want to market goods and/or services over their video and/or audio. Some configurations of the present invention also allow content producers/media channels and manufacturers to custom tailor their own measurable details on top of another's media stream. Furthermore, impulse buying is enhanced by providing purchase opportunities while viewing or listening to digital media or stream.

While the invention has been described in terms of various specific embodiments, those skilled in the art will recognize that the invention can be practiced with modification within the spirit and scope of the claims.

What is claimed is:

1. A method for providing purchasing opportunities to a consumer, the method comprising:
    under control of one or more processors of a server:
        receiving consumer activity comprising a viewing history of the consumer and a purchase history of the consumer, the consumer activity being monitored at a client device coupled to a display;
        accessing video data that includes at least one representation of a plurality of products in the video data;
        transmitting, to the client device associated with the consumer, a poll that queries whether, for a duration of the video data, the consumer is interested in viewing purchase opportunities associated with individual products of the plurality of products in the video data;
        determining, based at least partly on a response to the poll and the consumer activity, one or more products of the plurality of products to present to the client device as purchase opportunities during presentation of the video data;
        generating metadata corresponding to the one or more products represented within the video data;
        generating a digital stream that includes the metadata such that synchronous play of the digital stream and the video data synchronizes representations of the one or more products within the video data with corresponding portions of the metadata within the digital stream; and
        transmitting, to the client device or to a content provider, the digital stream and the video data, the video stream being separate from the video data.

2. The method of claim 1, wherein the metadata comprises product offerings, the method further comprising:
    providing tracked acceptance of the product offerings to one or more of content producers, content displayers, manufacturers, distributors, or third party advertisers, and wherein the tracked acceptance corresponds to the viewing history of the consumer that is associated with the one or more products.

3. The method of claim 1, wherein the consumer activity is first consumer activity, the client device is a first client device, the metadata is first metadata, and the one or more products are first one or more products, and wherein the method further comprises:
    receiving second consumer activity associated with the consumer, the second consumer activity being monitored at a second client device associated with the consumer;
    determining, based at least partly on the second consumer activity, second one or more products of the plurality of products represented within the video data;
    embedding second metadata corresponding to the second one or more products of the plurality of products represented within the video data; and
    transmitting the video data embedded with the second metadata indicating that the second one or more products are selectable during display of the video data at the second client device.

4. The method of claim 1, further comprising:
    receiving a selection of a product of the one or more products displayed in the video data; and
    fulfilling an order for the selection of the product.

5. The method of claim 4, further comprising:
    receiving a sale price of the order; and
    determining an amount of revenue from the sale price to share with one or more of content producers, content displayers, manufacturers, distributors, or third party advertisers.

6. The method of claim 5, further comprising:
    associating, with the metadata, one or more conditions under which the one or more products are offered, wherein the one or more conditions include at least one of:
        specifying that the product is to be offered during a range of video frames in the video data, or
        specifying that the product is to be offered over a predetermined time range during the presentation of the video data.

7. The method of claim 1, further comprising:
    creating a plurality of digital media streams configured to appeal to one or more respective demographic groups.

8. The method of claim 1, further comprising:
    causing display of a pop-up list on the client device, the pop-up list including a list of the one or more products that are available for purchase.

9. A system for providing purchasing opportunities to a consumer, the system comprising:
    memory for storing video data, information associated with one or more products, and metadata that corresponds to the one or more products, the metadata representing opportunities to purchase the one or more products; and
    one or more processors programmed to:
        receive consumer activity including at least a viewing history of the consumer and a purchase history of the consumer;

access the video data, the video data comprising representations of the one or more products within the video data;

transmit, to a client device associated with the consumer, a poll that queries whether, for a duration of the video data, the consumer has interest in viewing purchase opportunities associated with individual products of the one or more products within the video data;

determine, based at least in part on a response to the poll and the consumer activity, at least one product of the one or more products within the video data to present to the client device as an opportunity to purchase during presentation of the video data;

generate the metadata corresponding to the at least one product of the one or more products within the video data;

generate a digital stream embedded with the metadata such that synchronous play of the digital stream and the video data synchronizes product references for the at least one product of the one or more products within the video data with corresponding portions of the metadata within the digital stream; and transmit, to the client device:
the digital stream embedded with the metadata, and
the video data, the video data being separate from the digital stream embedded with the metadata.

10. The system of claim 9, wherein the one or more products are based at least in part on one or more of demographic data of the consumer or a preference of the consumer.

11. The system of claim 9, wherein the one or more processors are further programmed to:
provide a custom checkout user interface to the client device for interfacing with the metadata within the digital stream; and
wherein the custom checkout user interface provides an action request, the action request comprising one or more of:
adding the at least one product of the one or more products to a shopping cart,
adding the at least one product of the one or more products to a wish list, or
buying the at least one product of the one or more products.

12. The system of claim 9, wherein the one or more processors are further programmed to:
receive a sale price resulting from a sale of the one or more products; and
determine an amount of revenue from the sale price to share with one or more of content producers, content displayers, manufacturers, distributors, or third party advertisers.

13. The system of claim 12, wherein the amount of revenue is shared via a flat rate or a percentage of the sale price.

14. One or more non-transitory computer-readable media storing computer-executable instructions for:
receiving consumer data corresponding to purchase preferences of a consumer;
receiving, at a time of a performance of a live event, audio data associated with the performance of the live event;

transmitting a poll that queries whether for a duration of the performance of the live event, the consumer has interest in purchase opportunities associated with one or more products represented in the audio data;

determining, based at least in part on a response to the poll and the consumer data, at least one product of the one or more products to present during the performance of the live event;

generating, based at least in part on the audio data, metadata corresponding to the at least one product of the one or more products to be offered during the performance of the live event;

embedding the metadata into a digital stream such that, in response to synchronous play of the digital stream during the performance of the live event, product references for the one or more products are synchronized with corresponding portions of the metadata in the digital stream; and transmitting:
the digital stream embedded with the metadata, and
the audio data, the audio data being separate from the digital stream embedded with the metadata.

15. The one or more non-transitory computer-readable media of claim 14, wherein the metadata is further based on one or more of demographic data of the consumer.

16. The one or more non-transitory computer-readable media of claim 14, further comprising computer-executable instructions for:
receiving a sale price resulting from a sale of at least one product of the one or more products corresponding to the metadata; and
determining an amount of revenue from the sale price to share with one or more of content producers, content displayers, manufacturers, distributors, or third party advertisers.

17. The one or more non-transitory computer-readable media of claim 16, wherein the amount of revenue is shared via a flat rate or a percentage of the sale price.

18. The one or more non-transitory computer-readable media of claim 14, wherein the metadata comprises product offerings.

19. The one or more non-transitory computer-readable media of claim 18, further comprising computer-executable instructions for:
providing a custom checkout user interface to a client device for interfacing with the metadata; and
prompting, through the custom checkout user interface, performance of an action comprising one or more of buying the product, adding the product to a wish list, or adding the product to a shopping cart.

20. The one or more non-transitory computer-readable media of claim 14, further comprising computer-executable instructions for:
creating a plurality of digital media streams configured to appeal to one or more respective demographic groups.

21. The one or more non-transitory computer-readable media of claim 14, wherein the audio data corresponds to at least one of a song or an audio stream at a location associated with the live event; and
wherein the digital stream comprises a video stream.

* * * * *